United States Patent [19]
Newberth, III et al.

[11] Patent Number: 5,656,710
[45] Date of Patent: Aug. 12, 1997

[54] LOW VISCOSITY SILICONE SEALANT

[75] Inventors: Frederick F. Newberth, III, West Hartford; Hsien-Kun Chu, Wethersfield; Robert P. Cross, Rocky Hill; Peter A. Salamon, Hebron, all of Conn.

[73] Assignee: Loctite Corporation, Hartford, Conn.

[21] Appl. No.: 481,908

[22] Filed: Jun. 7, 1995

[51] Int. Cl.$^6$ ............................................. C08G 77/08
[52] U.S. Cl. .................. 528/14; 528/15; 528/17; 528/18; 528/34; 427/295; 427/296
[58] Field of Search .................. 528/15, 34, 14, 528/17, 18

[56] References Cited

U.S. PATENT DOCUMENTS

| | | | |
|---|---|---|---|
| 3,035,016 | 5/1962 | Bruner | 528/34 |
| 3,197,432 | 7/1965 | Lamoreaux | 528/32 |
| 3,845,161 | 10/1974 | Beers | 528/34 |
| 4,035,355 | 7/1977 | Baney et al. | 260/46.5 Y |
| 4,158,617 | 6/1979 | Eldred | 204/159.13 |
| 4,245,079 | 1/1981 | Matsumoto et al. | 528/15 |
| 4,503,208 | 3/1985 | Lin et al. | 528/15 |
| 4,528,081 | 7/1985 | Lien et al. | 204/159.13 |
| 4,699,802 | 10/1987 | Nakos et al. | 427/54.1 |
| 4,701,503 | 10/1987 | Sato | 525/478 |
| 4,742,092 | 5/1988 | Inoue et al. | 522/27 |
| 4,788,240 | 11/1988 | Fujimoto | 524/290 |
| 4,879,339 | 11/1989 | Yoshino et al. | 528/15 |
| 4,946,893 | 8/1990 | Saito et al. | 528/15 |
| 4,952,711 | 8/1990 | Jacobine et al. | 522/99 |
| 5,179,134 | 1/1993 | Chu et al. | 522/37 |
| 5,182,315 | 1/1993 | Chu et al. | 522/37 |
| 5,198,476 | 3/1993 | Kobayashi et al. | 522/31 |
| 5,212,211 | 5/1993 | Welch, II et al. | 522/37 |
| 5,391,593 | 2/1995 | Inoue et al. | 523/176 |

FOREIGN PATENT DOCUMENTS

| | | |
|---|---|---|
| 04268315 | 2/1991 | Japan . |

OTHER PUBLICATIONS

"Wacker Silicone Impregnating Resin H62 for Vacuum Pressure Impregnation," product brochure, Wacker–Chemie GmbH, Munich, Germany, Jan., 1991.

*Primary Examiner*—Melvyn I. Marquis
*Attorney, Agent, or Firm*—Steven J. Hultquist

[57] ABSTRACT

An impregnation sealant composition comprises a low viscosity vulcanizable silicone. The silicone is selected from the group consisting of (i) a heat curable silicone composition formed as the reaction product in the presence of a platinum catalyst of a first silicon containing material containing at least two SiH functionalities and having a molecular weight less than 2000 with a second silicon containing material containing at least two ethylenically unsaturated functionalities and having a molecular weight less than 2000, said silicone composition having a ratio of SiH to Si-ethylenically unsaturated functionalities of from about 0.8 to about 1.2; and (ii) a room temperature vulcanizing silicone composition formed as the reaction product of a silicone fluid containing at least two SiOH functionalities and having a molecular weight less than 2000 with a silane cross-linker of formula (I):

$$R_nSi(X)_{4-n} \qquad (I),$$

wherein the R groups are the same or different and selected from the group consisting of hydrogen, C1–C12 alkyl, C6–C12 aryl, C7–C18 arylalkyl, C7–C18 alkylaryl, haloalkyl, haloaryl, and monovalent ethylenically unsaturated radicals, X is a hydrolyzable functionality selected from the group consisting of alkoxy, oximino, enoloxy, acetoxy, amino, and amido, and n is an integer of from 0 to 1, with the proviso that when X is alkoxy, the reaction is in the presence of an organolithium, titanium or tin catalyst, said silicone composition having at least 1 silane per SiOH functionality.

16 Claims, 4 Drawing Sheets

LOW VISCOSITY SILICONE SEALANT

BACKGROUND OF THE INVENTION

1. Field of the Invention

This invention relates to low viscosity, reactive silicone sealant compositions for sealing porosity in plastics, metals and other porous materials requiring a fill and/or seal. More particularly, the invention relates to silicone sealant compositions having high thermal and chemical resistance.

2. Description of Related Art

Impregnation sealing of microporosity is a commonly used methodology in the art of forming a variety of articles, structural components, and assemblies, as for example castings, die castings, electronic components, powder metal parts, fiber-reinforced resin composites and other materials which exhibit porosity.

Originally, materials, manufacturing techniques, and casting designs were specified to minimize the occurrence of porosity in formed objects, based on the hypotheses that microporosity was structurally and functionally undesirable and its presence in formed articles embodied poor manufacturing. This approach severely limited design freedom, and resulted in significant rejection of parts exhibiting any substantial porosity characteristics.

This design strategy changed in the 1970s as a result of the energy crisis, which resulted in a major switch to lighter metals for structural applications. During this period many iron parts were changed to cast aluminum components, and many other parts were designed as die castings. This switch to lighter metals resulted in weight savings in many applications where energy consumption and power optimization were important, but created a new and persistent problem of microporosity in the light metal formed parts. The occurrence of microporosity is particularly acute in components formed from metal powder, and presents a significant obstacle to commercial utility, particularly when such porous parts are employed in fluid power systems and other liquid handling applications.

In order to overcome the deficiencies attendant the presence of microporosity in formed articles of the above-described types, impregnation sealing technology was developed, by which the porosity of the porous parts was impregnated with a sealant composition. Upon curing of the impregnated sealant, the resulting sealed part is suitable for use in fluid exposure applications, as well as facilitating plating, coating, and further processing of the formed article.

Among the impregnation sealing compositions which have been developed to date are self-curing anaerobic sealants and thermal curing sealants, as well as sealants which cure by both anaerobic and heat cure mechanisms.

Electronic encapsulating sealant/coating compositions, curable both anaerobically and with exposure to UV light, have also been developed for vacuum impregnation of electrical components such as transformers, wherein the encapsulating sealant is anaerobically cured inside the device and is cured on the outside surface with UV light to encapsulate the device. To effect a thorough outer surface curing of the sealant, such compositions typically contain a UV photoinitiator in concentrations substantially in excess of 5% by weight based on the weight of the curable component thereof.

In addition, sealant/coating compositions have been developed for sealing of laminates, composite materials, and the like, containing macroscopic or gross voids into which the sealant/coating composition after surface application flows by capillary, or wicking action. Generally, sealant/coating compositions employed in such applications are highly viscous in character, having a viscosity substantially greater than 1000 centipoise, as measured by the Cannon-Fenske viscosity determination method. One such conventional formulation, having a Cannon-Fenske viscosity of 4200 centipoise, contains 3.4 weight percent of a UV photoinitiator, based on the weight of curable component in the sealant/coating composition, to effect surface cure of the composition under UV radiation, in combination with internal anaerobic curing of the composition. The high viscosities of such compositions generally require long processing times for impregnation of microporosity.

Among the previously developed impregnating compositions for sealing porous parts are the compositions disclosed in the patents identified and discussed below.

U.S. Pat. No. 3,672,942 to Neumann discloses an anaerobic impregnant comprising a free-radical polymerizable acrylate ester monomer and free-radical polymerization initiator therefor, e.g., a hydroperoxide. The patent discloses utilizing an accelerator in the impregnant, such as aldehyde-amine condensation products, sulfur-containing free-radical accelerators, or organic compounds containing an oxidizable transition metal. This reference also discloses a vacuum impregnation process in which the porous article is placed in a vacuum vessel, followed by drawing of vacuum therein and covering the article with the disclosed anaerobic sealant so that upon release of vacuum, the sealant is forced into the evacuated porosity of the article. The surface of the impregnated article then is treated with the aforementioned polymerization accelerator to cure the sealant at the outer surface of the porous article.

U.S. Pat. No. 3,969,552 describes an impregnation composition comprising an acrylic anaerobic curing resin and a peroxy initiator therefor. The wash solution is an aqueous solution of a surfactant of specified formula. The patent further discloses that the aqueous surfactant solution may contain an accelerator to effect polymerization of the anaerobic sealant in the surface areas of the impregnated part being washed.

U.S. Pat. No. Re. 32,240 to DeMarco describes a self-emulsifying anaerobic composition for porosity impregnation applications, comprising an anaerobically curing monomer such as an acrylic ester, a peroxy initiator therefor, e.g., a hydroperoxide or perester, an anionic or nonionic surfactant which is dissolved in the composition and renders it self-emulsifying upon mixing with water, and optionally an accelerator for the anaerobic polymerization, e.g., a sulfimide.

U.S. Pat. No. 4,632,945 to Garcia, et al, discloses an anaerobic sealant material comprising a (meth)acrylate monomer, a hydroperoxide or perester initiator, an accelerator having —$SO_2NCO$— functionality, and a transition metal co-accelerator comprising a source of copper iron and an iron salt or ferrocenyl compound.

The above-described anaerobic sealant compositions are typically impregnated in the porosity of porous metal parts by wet vacuum impregnation, wet vacuum/pressure impregnation, or dry vacuum/pressure impregnation.

All of these and other known reactive sealant compositions are either polyester or organic (meth)acrylate monomer based. Hence as a consequence, presently available reactive sealant compositions are severely limited in that they have thermal resistance up to around 350° F. After such temperature is reached the cured resin decomposes and thereby shrinks away from within the interior of the pores or reduces in weight thereby breaking the seal. Additionally, such prior art sealant compositions if not fully cured within the porosity of parts and components used in electronics, can be somewhat conductive and therefore interfere with electrical properties of the parts.

Hence, it would be a significant advance in the art to provide a sealant composition having improved thermal and chemical resistance and which is non-conductive, even when not fully cured thereby not interfering with electrical properties of impregnated electronic parts.

SUMMARY OF THE INVENTION

It is therefore an object of the present invention to provide a reactive, i.e., vulcanizable sealant composition having high temperature and chemical resistance and which will not interfere with electrical properties of impregnated electronic parts.

In one embodiment the present invention is directed to an impregnation sealant composition comprising a low viscosity vulcanizable silicone. The vulcanizable silicone is selected from the group consisting of (i) a heat curable silicone composition formed as the reaction product in the presence of a platinum catalyst of a first silicon containing material containing at least two SiH functionalities and having a molecular weight less than 2000 with a second silicon containing material containing at least two ethylenically unsaturated functionalities and having a molecular weight less than 2000, said silicone composition having a ratio of SiH to Si-ethylenically unsaturated functionalities of from about 0.8 to about 1.2; and (ii) a room temperature vulcanizing silicone composition formed as the reaction product of a silicone fluid containing at least two SiOH functionalities and having a molecular weight less than 2000 with a silane crosslinker of formula (I):

wherein the R groups are the same or different and selected from the group consisting of hydrogen, C1–C12 alkyl, C6–C12 aryl, C7–C18 arylalkyl, C7–C18 alkylaryl, haloalkyl, haloaryl, and monovalent ethylenically unsaturated radicals, X is a hydrolyzable functionality selected from the group consisting of alkoxy, oximino, enoloxy, acetoxy, amino, and amido, and n is an integer of from 0 to 1, with the proviso that when X is alkoxy, the reaction takes place in the presence of a transition metal catalyst, such as for example, an organolithium, titanium or tin catalyst, with the further proviso that when the reaction takes place in the presence of organolithium, titanium or tin is further added. The silicone composition has at least 1 silane per SiOH functionality.

The present invention reactive silicone sealant penetrates and fills voids in porous materials. By using a vacuum process, air is removed from the porosity of parts to be impregnated and replaced with the reactive silicone. The silicone sealant may then be cured by heating the impregnated part.

For purposes of the present invention, low viscosity is intended to mean that viscosity which is low enough to enter into the pores of an article having porosity to be impregnated. Typically, such viscosity is from about 1 to about 1000 centipoise, but viscosities outside of this range may be used when appropriate. All molecular weights as reported herein are as measured at room temperature by gel permeation chromatography and all viscosities reported herein are as measured at room temperature by a Brooksfield Viscometer unless otherwise stated

DETAILED DESCRIPTION OF THE INVENTION AND PREFERRED EMBODIMENTS THEREOF

The present invention is based on the unexpected discovery that by using relatively low molecular weight, (i.e., less than 2000 molecular weight) starting materials, reactive silicone compositions can be produced for use in impregnation processes for impregnating the porosity of porous articles. Surprisingly, the present compositions have high thermal resistance even when cured inside the porosity of a porous article. Such impregnation sealant compositions comprising vulcanizable silicones have heretofore been unknown.

In a preferred embodiment the present invention is directed to an impregnation sealant composition comprising a low viscosity vulcanizable silicone. Such viscosity is typically from about 1 to about 1000, preferably from about 1 to about 500, and most preferably from about 1 to about 100 centipoise as measured at room temperature.

The present invention vulcanizable silicone is selected from the group consisting of (i) a heat curable silicone composition formed as the reaction product in the presence of a platinum catalyst of a first silicon containing material containing at least two SiH functionalities and having a molecular weight less than 2000 with a second silicon containing material containing at least two ethylenically unsaturated functionalities and having a molecular weight less than 2000, said silicone composition having a ratio of SiH to Si-ethylenically unsaturated functionalities of from about 0.8 to about 1.2; and (ii) a room temperature vulcanizing silicone composition formed as the reaction product of a silicone fluid containing at least two SiOH functionalities and having a molecular weight less than 2000 with a silane crosslinker of formula (I):

wherein the R groups are the same or different and selected from the group consisting of hydrogen, C1–C12 alkyl, C6–C12 aryl, C7–C18 arylalkyl, C7–C18 alkylaryl, haloalkyl, haloaryl, and monovalent ethylenically unsaturated radicals, X is a hydrolyzable functionality selected from the group consisting of alkoxy, oximino, enoloxy, acetoxy, amino, and amido, and n is an integer of from 0 to 1. The silicone composition has at least 1 silane per SiOH functionality.

The vulcanizable silicone sealant compositions according to the present invention may optionally contain, as needed, polymerization inhibitors and other stabilization additives as well as any other silicone composition additives generally known in the art. Examples of inhibitors useful in the present compositions include, but are not limited to, 2-methyl-3-butynol and 2-methyl-3-hexyn-ol.

In the silane cross-linkers, when X is alkoxy, the reaction to form the room temperature vulcanizing silicone fluid takes place in the presence of a transition metal catalyst, such as an organolithium, titanium or tin catalyst. When an organolithium catalyst is used, a titanium or tin catalyst is further added. An exemplary process for preparing silane cross-linkers wherein the hydrolyzable functionality, X, is alkoxy, for use in the present invention is taught in U.S. Pat. No. 5,300,608, hereby incorporated by reference herein.

In compositions according to the present invention when the low viscosity vulcanizable silicone is a heat curable silicone composition at least one of said first and said second silicon containing materials has a molecular weight that is less than 1000.

In such heat curable silicone compositions according to the present invention, examples of the first silicon containing material include, but are not limited to, linear polyorganosiloxanes, monomeric silanes, polydimethylsiloxane chains having SiH functionality located at either the ends or the middle of the chains and cyclic siloxanes. Preferably, the first silicon containing material is selected from the group consisting of SiH terminated polydimethylsiloxane, copolymers of polydimethyl siloxane and polymonomethyl siloxane, tetrakisdimethylsilylsilane, and tetramethyl cylcotetrasiloxane.

Typical examples of the second silicon containing material include, but are not limited to, polyorganosiloxane containing ethylenically unsaturated functionalities and monomeric silanes containing ethylenically unsaturated functionalities. Preferably, the second silicon containing material is vinyl terminated polydimethylsiloxane, tetramethyl tetravinyl cyclotetrasilane or tetrakis(vinyl dimethylsilyl)silane.

In compositions according to the present invention when the low viscosity vulcanizable silicone is a room temperature vulcanizing silicone composition, the silicone fluid has a molecular weight that is preferably less than 1000.

In such room temperature vulcanizing compositions according to the present invention, the silicone fluid is selected from the group consisting of hydroxyl terminated polydimethyl siloxane and organopolysiloxane copolymers of M units and Q units.

M units are generally known in the art as units having the formula:

$$R^1_3SiO_{1/2},$$

wherein $R^1$ is selected from substituted or unsubstituted monovalent hydrocarbon radicals and Q units are generally known in the art as units having the formula:

$$SiO_{2/4}.$$

When the R group on the silane cross-linker is selected from the group consisting of C1–C12 alkyl and C6–C12 aryl the silane cross-linker is selected from the group consisting of methyltrimethylmethoxysilane, vinyltrimethoxysilane, methyltrioximosilane, vinyltrioximinosilane, phenyl trioximinosilane, methyltriacetoxysilane, vinyltriacetoxysilane, phenyltriacetoxysilane, methyltrienoxysilane, vinyltrienoxysilane, phenyltrienoxysilane and tetraethoxysilane.

In an alternative embodiment, the present invention is directed to an impregnation process for sealing porosity in porous articles. The process comprises placing an article having porosity in an impregnation chamber and a vacuum is applied to the impregnation chamber to evacuate the porosity of the article therein. The article having porosity is contacted at higher than vacuum pressure with an impregnation sealant composition comprising a low viscosity vulcanizable silicone.

The vulcanizable silicone for use in the present invention process is selected from the group consisting of (i) a heat curable silicone composition formed as the reaction product in the presence of a platinum catalyst of a first silicon containing material containing at least two SiH functionalities and having a molecular weight less than 2000 with a second silicon containing material containing at least two ethylenically unsaturated functionalities and having a molecular weight less than 2000, said silicone composition having a ratio of SiH to Si-ethylenically unsaturated functionalities of from about 0.8 to about 1.2; and (ii) a room temperature vulcanizing silicone composition formed as the reaction product of a silicone fluid containing at least two SiOH functionalities and having a molecular weight less than 2000 with a silane cross-linker of formula (I):

$$R_nSi(X)_{4-n}(I),$$

wherein the R groups are the same or different and selected from the group consisting of hydrogen, C1–C12 alkyl, C6–C12 aryl, C7–C18 arylalkyl, C7–C18 alkylaryl, haloalkyl, haloaryl, and monovalent ethylenically unsaturated radicals, X is a hydrolyzable functionality selected from the group consisting of alkoxy, oximino, enoloxy, acefoxy, amino, and amido, and n is an integer of from 0 to 1, with the proviso that when X is alkoxy, the reaction takes place in the presence of a transitional metal catalyst such as for example an organolithium, titanium or tin catalyst. When the reaction takes place in the presence of an organolithium catalyst, a tin or titanium catalyst is further added. The silicone composition has at least 1 silane per SiOH functionality. Penetration of said composition into the porosity of the article is thereby caused. The composition is then cured within the pores of the article to seal the article.

In the process according to the present invention, the penetration of the composition into the porosity of the article may optionally be assisted by pressurizing the impregnation chamber.

Typical processes employing the present silicone compounds are briefly described below with reference to impregnating of porous parts contained in a basket which is introduced into the impregnation chamber, which is the typical method of parts containment if the parts are of suitably small size; in the case of larger parts, the same are typically mounted on or suspended from hoist or other carrier means which is successively translated through the process system including the impregnation chamber.

In the wet vacuum impregnation process, the basket of porous parts is submerged into a vacuum tank of sealant. A short-term, e.g., 10–12 minute, vacuum cycle removes air from the porosity of the parts. The chamber then is returned to ambient pressure, with sealant penetrating into the evacuated porosity. The basket of parts then may be spun briefly in the vacuum tank to allow centrifugal force to eliminate excess sealant waste.

The wet vacuum/pressure impregnation process is similarly conducted, but with the impregnation chamber being pressurized at the end of the vacuum cycle to drive sealant further into small porosity passages.

In the dry vacuum/pressure impregnation method, the basket of porous parts is placed directly in the dry vacuum chamber. Air is evacuated from the porosity in the parts for a selected length of time, e.g., 10 minutes. A transfer valve then is open, allowing sealant to enter the vacuum chamber from a storage reservoir. The chamber is automatically pressurized to force sealant into the parts. After impregnation, while the sealant is being returned to the reservoir, a centrifuge operation spins the basket to remove excess surface sealant.

Among the foregoing methods, wet vacuum impregnation techniques are generally more widely employed than the dry vacuum/pressure impregnation process, however, either process is suitable for use in the present invention.

Following the initial impregnation step, the impregnated parts are optionally transferred to an agitated water rinse zone, for removal of any remaining surface sealant or sealant trapped in blind holes of the impregnated parts. The agitation of the water rinse zone may be effected by movement of the basket or suspended parts in such zone and/or mechanical means for effecting circulation of water therein. In the case of small porous parts contained in a basket, it frequently is desirable to operate the water rinse zone in a "tumbling basket" mode to enhance the washing operation and prevent parts with surface sealant deposits which are in contact with one another from sticking together, as a result of polymerization of the contiguous surface sealant deposits.

Thereafter, the impregnated parts may be transferred to a final rinse zone. This final rinse solution may be at elevate temperature, e.g., on the order of about 150° F. or higher, to warm the impregnated parts for quick drying, and to accelerate curing of the impregnant within the interior porosity of the article, the rate of such cure increasing with increasing temperature. Alternatively, curing may be done at this juncture by the application of hot air.

The final rinse step may also incorporate in the rinse solution suitable rust inhibitor material, for application of a rust inhibiting film to the impregnated article.

As a variation on the above-described impregnation system, when a heat-curing silicone fluid is used in place of the room temperature-curing resin, the activating and final rinsing steps previously described are eliminated in favor of a hot rinse final step.

In impregnation systems wherein room temperature vulcanizing silicone compositions are used, after the impregnation process, the parts could be removed from the impregnation basket and left at room temperature to cure.

In use, the impregnation composition may be conventionally employed in an impregnation chamber of typical construction, wherein a "wet" or "dry" vacuum is imposed on the porous parts to be impregnated and the evacuated porous parts contact the impregnation composition at higher, e.g. ambient pressure, whereby the impregnant composition pass into the porosity of the porous parts to effect impregnation thereof. It may be suitable in some instances to add catalyst or accelerator species, to the impregnation composition.

Figure 1:
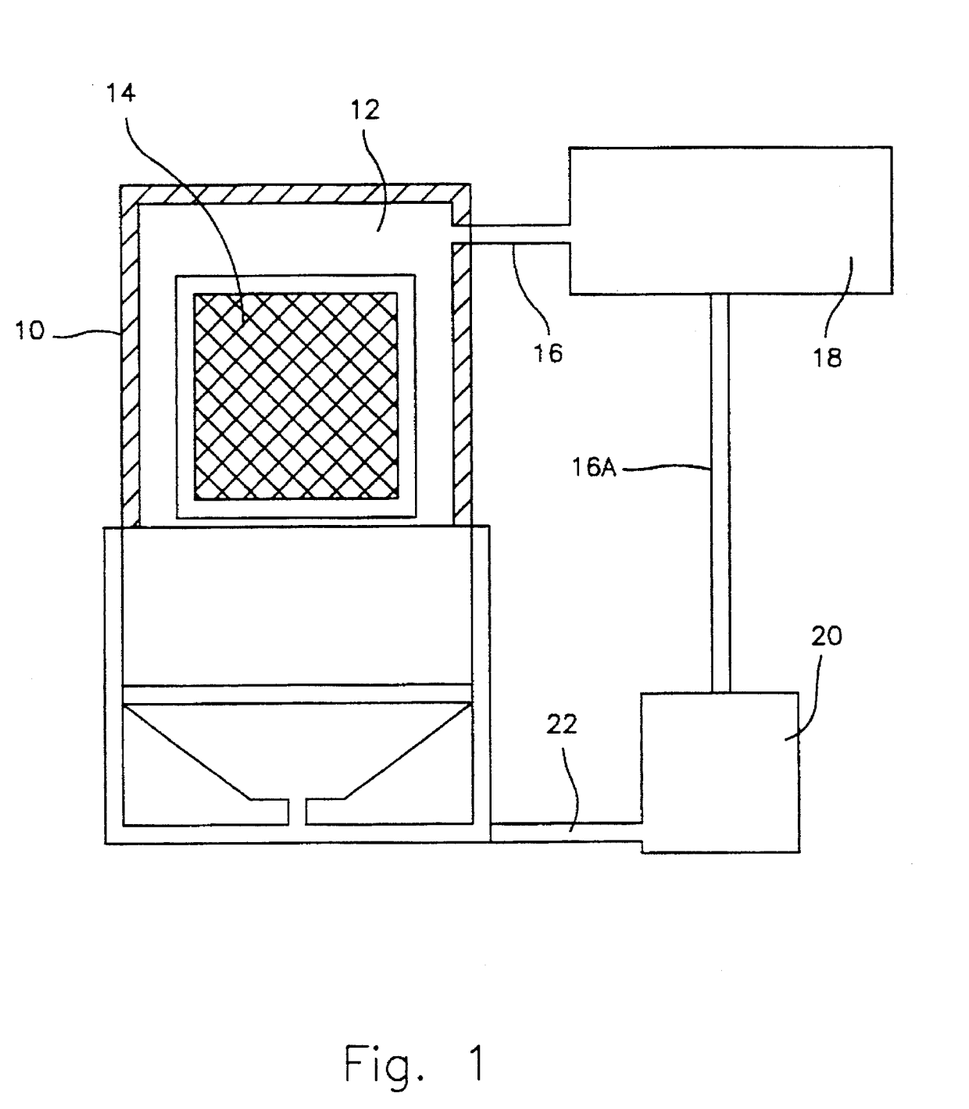
FIG. 1 is a schematic illustration of a process system according to one embodiment of the present invention for impregnating porosity of porous articles.

Referring now to FIG. 1, there is shown a schematic depiction of a process system for "dry" vacuum impregnation of porosity of porous articles. While the invention is shown with respect to "dry" vacuum arrangement it will be recognized that this description is for illustrative purpose only and that the impregnation compositions are equally applicable to process systems including "wet" or "dry" vacuum impregnation of porous parts, the choice of "wet" or "dry" vacuum impregnation depending on the composition and porous character of the porous parts, and their intended end use application.

The porous part impregnation system in this illustrative embodiment comprises an impregnation chamber 10 having an interior volume 12 in which is disposed basket 14 containing porous metal parts (not shown).

The impregnation chamber 10 is joined in flow communication via conduit 16 with a vacuum 18, for selectively applying a vacuum to the impregnation chamber so that the air therein is withdrawn to evacuate the porosity of the porous parts in the basket.

Subsequent to evacuation of interior volume 12 of the impregnation chamber 10, impregnation sealing composition according to the present invention is stored in reservoir 20 and maintained therein at higher pressure than the evacuated chamber, is flowed in line 22 into the interior volume of the impregnation chamber. The vacuum applied by vacuum 18 is discontinued once the impregnation composition fills the impregnation chamber to the desired extent.

As a result, the impregnation sealant composition penetrates into the porosity of the porous parts in basket 14. Such hydrostatic impregnation may be further assisted by reversing the vacuum 18 to pressurize the interior volume 12 of the impregnation chamber 10, to force the impregnation composition further into small porosity passages of the part to be impregnated.

The features and advantages of the invention are more fully shown by the following non-limiting examples, wherein all parts and percentages are by weight, unless otherwise expressly stated.

EXAMPLES

Example 1

A base anaerobic impregnation composition was made having the formulation set out in Table I.

TABLE I

| Component | Concentration wt % |
|---|---|
| Triethylene Glycol Dimethacrylate | 74.00 |
| Lauryl Methacrylate | 15.00 |
| Hydroxypropylmethacrylate | 5.00 |
| Bis(nonylphenoxypoly(ethleneoxyethyl)fumarate (surfactant) | 5.24 |
| Fluoresence | 0.02 |
| Quinones | 0.04 |
| Saccharin | 0.30 |
| Peroxide | 0.40 |
| Total | 100.00 |

A sample of this was cured in a cylindrical shape.

Example 2

A sample solution was made up of 97.5% by weight of the above-described impregnation composition, 2.0% by weight 1-Benzoyl Cyclohexanol and 0.5% by weight 2,2-dimethoxy-2-phenyl acetophenone. Approximately 2–4 grams of the sample was placed in an aluminum dish, in which the liquid depth was ⅛ inch.

A UV light source L/C chamber with a 12 inch lamp set at 300 watts per inch was employed as an actinic radiation exposure source for curing the sample.

Example 3

A sample solution was made up by mixing together 409 g of a copolymer of polydimethylsiloxane and polymonomethyl siloxane 4.5 mmole Si-H/gram, 91 g of 1,3,5,7-tetramethyl-1,3,5,7-tetravinyl-cyclotetrasiloxane, 1.5 g of 2-methyl-3-butyne-2-ol, 0.060 g of fluorescent dye and 0.625 g of a platinum-1,3,5,7-tetramethyl-1,3,5,7-tetravinyl-polydimethylsiloxane complex. The combined viscosity of the hydride terminated polydimethylsiloxane and 1,3,5,7-tetramethyl-1,3,5,7-tetravinyl-cyclotetrasiloxane was less than 500 centipoise.

Approximately 2–4 grams of the sample was placed in a plated aluminum dish, in which the liquid depth was ⅛ inch. The dish was placed in a 150° C. oven for ten minutes and then let sit on laboratory bench for approximately 24 hours after which it cured.

Example 4

A sample solution was made up by reacting together 500 g of 60 centistoke silanol-terminated polydimethyl siloxane, 153 g of methyl trimethoxy silane and 0.21 g of butyl lithium. To resulting material was further added 0.5% titanium tetra isopropoxide and fluorescent dye.

Approximately 2–4 grams of the sample was placed in a plated aluminum dish, in which the liquid depth was ⅛ inch. The dish was left sitting on the laboratory bench in open air for 3 days after which it cured.

Example 5

A sample solution was made up by mixing together 34.47 grams of tetravinyltetramethylcylcotetrasiloxane, 24.05 g of tetramethyltetrahydrocyclotetrasiloxane, 0.1756 g 3-methyl-2-butyn-2-ol, 0.0732 g platinum catalyst and 0.0117 fluorescing agent.

Approximately 2–4 grams of the sample was placed in a plated aluminum dish, in which the liquid depth was ⅛ inch. The dish was placed in a 150° C. oven for approximately ten minutes and then let sit on the laboratory bench for approximately 24 hours after which it cured to a glass-like solid.

Example 6

Figure 2:
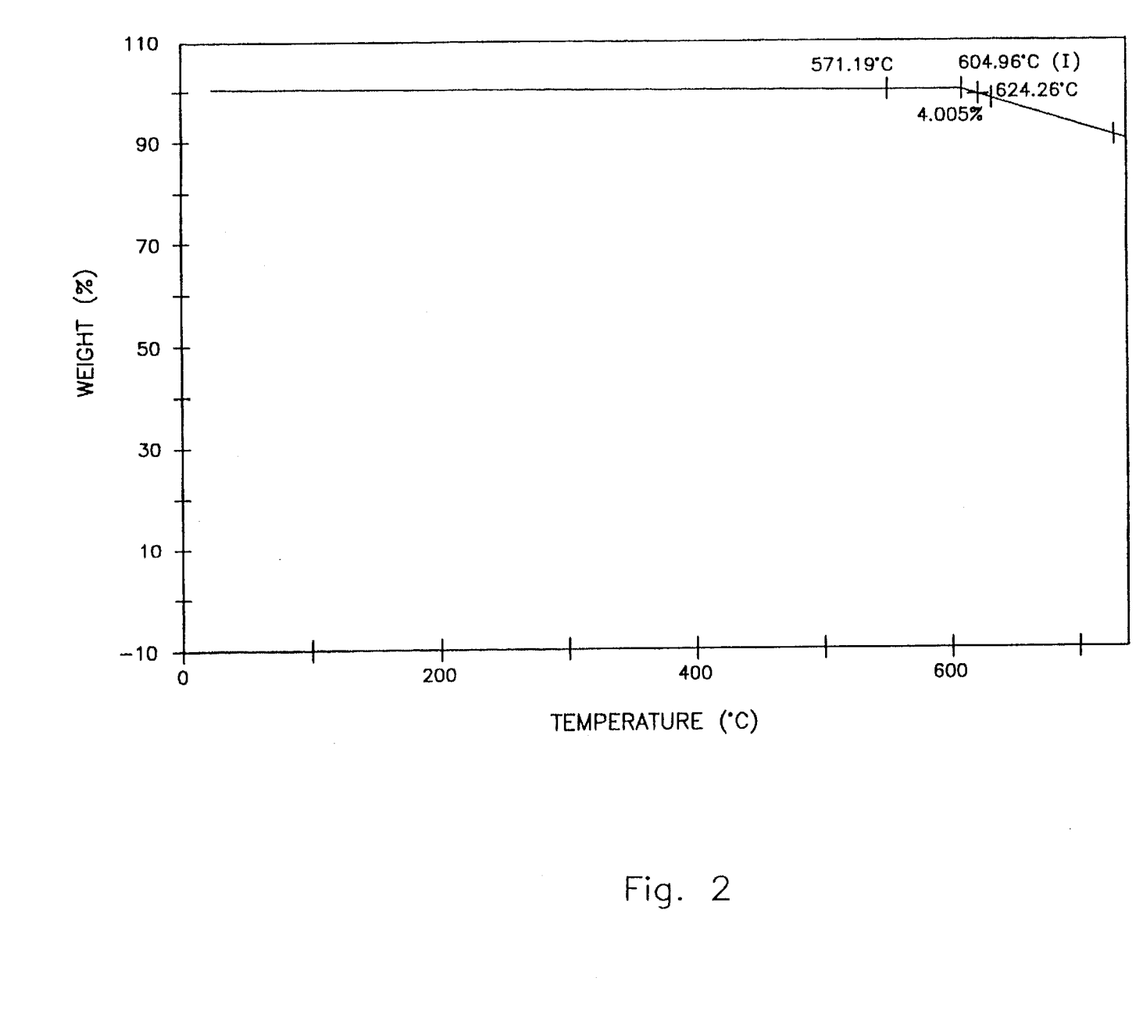
FIG. 2 is a graph charting the weight of an impregnation sealant composition according to the present invention as a function of elevated temperature exposure over time.
Figure 3:
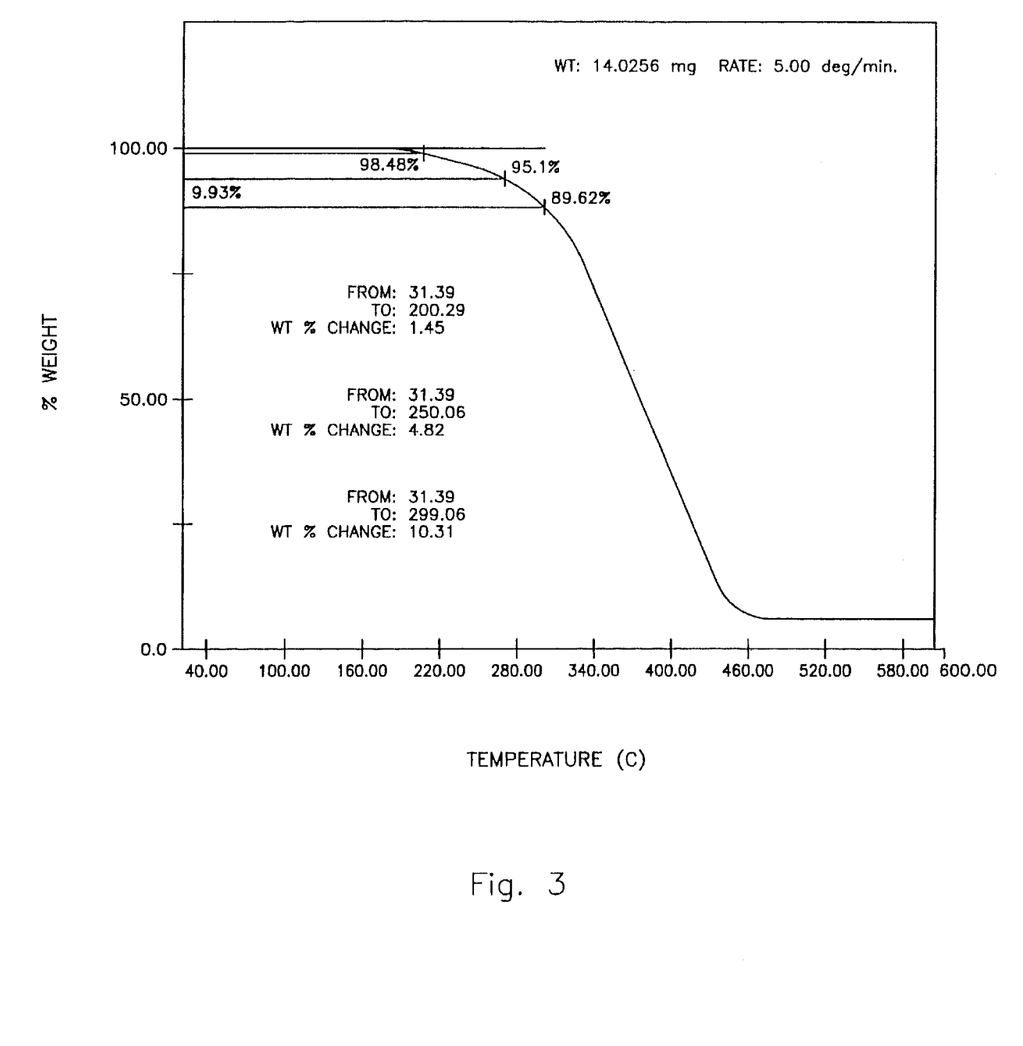
FIG. 3 is a graph charting the weight of a known impregnation sealant as a function of elevated temperature exposure over time.
Figure 4:
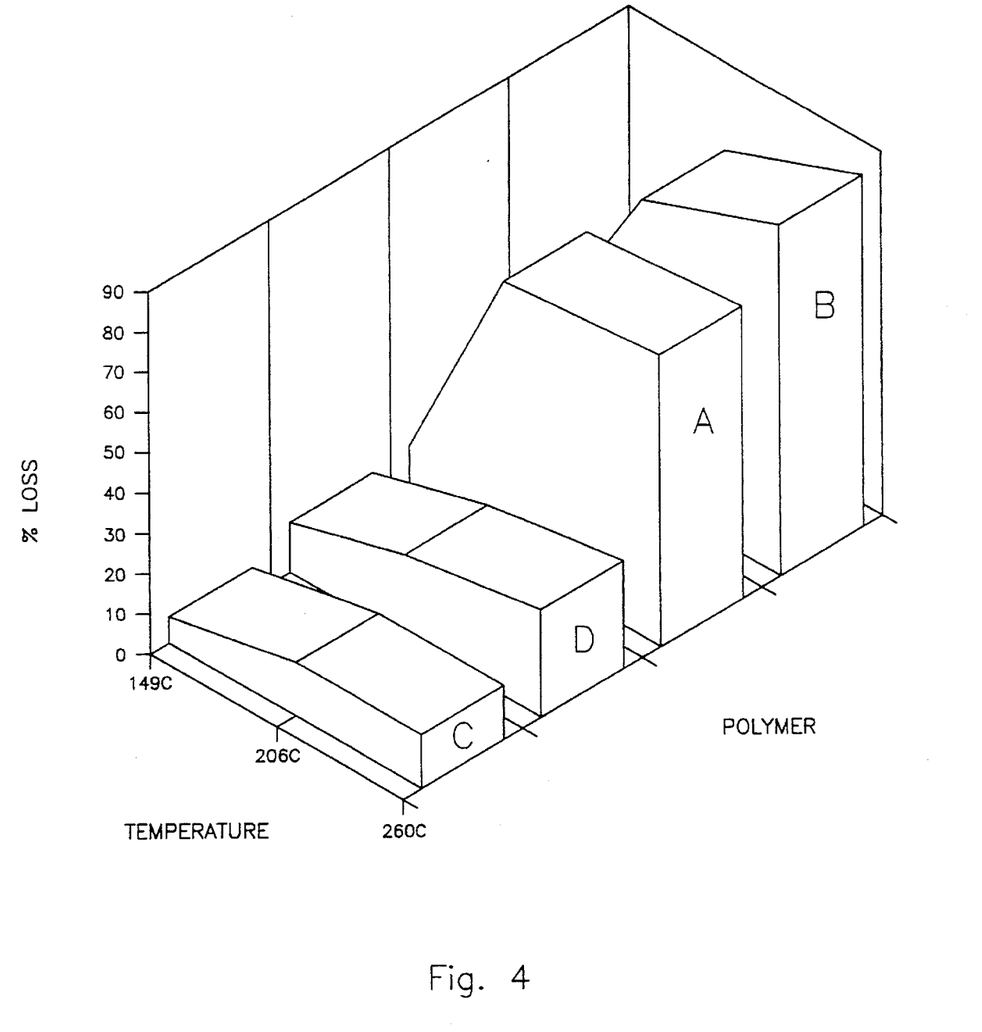
FIG. 4 is a three dimensional graph wherein the respective weight loss of two impregnation sealant compositions according to the present invention are compared to the weight loss of two known impregnation sealants as a function of elevated temperature over time.

Three samples each of the cured samples obtained in Examples 1–4 above, were weighed and their initial weight recorded and then placed in three separate ovens (149° C., 206° C. and 260° C.) and weights were recorded at intervals over a period of four weeks. FIG. 4 is a three dimensional graph showing a comparison of the weight loss observed in the cured samples obtained in Example 1 (A), Example 2 (B), Example 3 (C) and Example 4 (D) as a function of three separate temperatures over the four week time period, i.e., (149° C., 206° C. and 260° C.). Using thermogravimetric analysis, the weight of the cured sample obtained in Example 5 was measured and then plotted as a function of increase in temperature by 20° C. per minute (50° C. to 700° C.) over time in FIG. 2. Using thermogravimetric analysis, the weight of the cured sample obtained in Example 1 was measured and then plotted as a function of increase in temperature by 5° C. per minute (50° C.–600° C.) over time in FIG. 3.

While the invention has been illustratively described herein with reference to various preferred features, aspects and embodiments, it will be appreciated that the invention is not thus limited, and may be widely varied in respect of alternative variations, modification, and other embodiments, and therefore the invention is to be broadly construed as including such alternative variations, modification and other embodiments, within the spirit and scope of the invention as claimed.

What is claimed is:

1. An impregnation sealant composition comprising:
   a vulcanizable silicone having a viscosity in the range of from about 1 to 100 centipoise, said vulcanizable silicone being selected from the group consisting of:
   (i) a heat curable silicone composition comprising a platinum catalyst, a first linear silicon containing material containing at least two SiH functionalities and having a molecular weight greater than zero and less than 2000, and a second silicon containing material containing at least two ethylenically unsaturated functionalities and having a molecular weight greater than zero and less than 2000, said silicone composition having a ratio of SiH to Si-ethylenically unsaturated functionalities of from about 0.8 to about 1.2; and
   (ii) a room temperature vulcanizing silicone composition formed as the reaction product by reaction of a silicone fluid containing at least two SiOH functionalities and having a molecular weight greater than zero and less than 2000 with a silane cross-linker of formula (I):

$$R_n Si(X)_{4-n} \qquad (I),$$

wherein the R groups are the same or different and selected from the group consisting of hydrogen, $C_1$–$C_{12}$ alkyl, $C_6$–$C_{12}$ aryl, $C_7$–$C_{18}$ arylalkyl, $C_7$–$C_{18}$ alkylaryl, haloalkyl, haloaryl, and monovalent ethylenically unsaturated radicals, X is a hydrolyzable functionality selected from the group consisting of alkoxy, oximino, enoloxy, amino, and amido, and n is an integer of from 0 to 1, with the proviso that when X is alkoxy, the reaction is in the presence of an organolithium, titanium or tin catalyst, said silicone composition having at least 1 silane per SiOH functionality.

2. The composition according to claim 1, wherein the vulcanizable silicone is a heat curable silicone composition.

3. The composition according to claim 2, wherein at least one of said first and second silicon containing materials has a molecular weight that is greater than zero and less than 1000.

4. The composition according to claim 2, wherein the first linear silicon containing material is selected from the group consisting of polyorganosiloxanes and monomeric silanes.

5. The composition according to claim 4, wherein the first linear silicon containing material is selected from the group consisting of SiH terminated polydimethylsiloxane, copolymers of polydimethyl siloxane and polymonomethyl siloxane, and tetrakisdimethylsilylsilane.

6. The composition according to claim 2, wherein the second silicon containing material is selected from the group consisting of polyorganosiloxane containing ethylenically unsaturated functionalities and monomeric silanes containing ethylenically unsaturated functionalities.

7. The composition according to claim 6, wherein the second silicon containing material is selected from the group consisting of vinyl terminated polydimethylsiloxane, tetramethyl tetravinyl cyclotetrasilane and tetrakis(vinyl dimethylsilyl) silane.

8. The composition according to claim 1, wherein the vulcanizable silicone is a room temperature vulcanizing silicone composition.

9. The composition according to claim 8, wherein said silicone fluid has a molecular weight that is greater than zero and less than 1000.

10. The composition according to claim 8, wherein said silicone fluid is selected from the group consisting of hydroxyl terminated polydimethyl siloxane and organopolysiloxane copolymers of M and Q units.

11. The composition according to claim 8, wherein R is selected from the group consisting of C1–C12 alkyl and C6–C12 aryl.

12. The composition according to claim 11, wherein said silane cross-linker is selected from the group consisting of methyltrimethylmethoxysilane, vinyltrimethoxysilane, methyltrioximosilane, vinyltrioximinosilane, phenyltrioximinosilane, methyltrienoxysilane, vinyltrienoxysilane, phenyltrienoxysilane and tetraethoxysilane.

13. The composition according to claim 2, wherein the first linear silicon containing material comprises polydimethylsiloxane chains having SiH functionality located either at ends or the middle of the chains.

14. The composition according to claim 1, wherein the heat curable silicone composition consists essentially of the platinum catalyst and the first and second silicon containing materials.

15. The composition according to claim 1, wherein the room temperature vulcanizing silicone composition consists essentially of the reaction product of said silicone fluid and said silane cross-linker.

16. The composition according to claim 1, wherein the room temperature vulcanizing silicone composition comprises an organolithium catalyst.

* * * * *

UNITED STATES PATENT AND TRADEMARK OFFICE
CERTIFICATE OF CORRECTION

PATENT NO. : 5,656,710
DATED : August 12, 1997
INVENTOR(S) : Frederick F. Newberth, III, et al.

It is certified that error appears in the above-indentified patent and that said Letters Patent is hereby corrected as shown below:

Column 6, Line 34    change "acefoxy," to --acetoxy,--
Column 7, Line 31    change "elevate" to --elevated--

Signed and Sealed this

Eleventh Day of November, 1997

Attest:

BRUCE LEHMAN

Attesting Officer    Commissioner of Patents and Trademarks